United States Patent
Kasazumi et al.

(10) Patent No.: US 7,562,988 B2
(45) Date of Patent: Jul. 21, 2009

(54) TWO-DIMENSIONAL IMAGE DISPLAY DEVICE

(75) Inventors: Ken'ichi Kasazumi, Osaka (JP);
Kiminori Mizuuchi, Osaka (JP);
Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 406 days.

(21) Appl. No.: 10/584,074

(22) PCT Filed: Dec. 21, 2004

(86) PCT No.: PCT/JP2004/019059
§ 371 (c)(1),
(2), (4) Date: Jun. 22, 2006

(87) PCT Pub. No.: WO2005/062116
PCT Pub. Date: Jul. 7, 2005

(65) Prior Publication Data
US 2007/0165184 A1    Jul. 19, 2007

(30) Foreign Application Priority Data
Dec. 22, 2003    (JP) .............................. 2003-425599

(51) Int. Cl.
*G03B 21/00* (2006.01)
*G03B 21/20* (2006.01)
*G03B 21/26* (2006.01)

(52) U.S. Cl. .............................. 353/94; 353/31; 353/85
(58) Field of Classification Search .................. 353/94, 353/31, 85; 362/259; 348/744, 655
See application file for complete search history.

(56) References Cited

U.S. PATENT DOCUMENTS

| 6,309,072 | B1 * | 10/2001 | Deter .......................... 353/31 |
| 6,900,916 | B2 * | 5/2005 | Okazaki et al. ............. 359/202 |
| 2003/0210371 | A1 * | 11/2003 | Chaudhari et al. .......... 349/124 |
| 2003/0214633 | A1 * | 11/2003 | Roddy et al. .................. 353/31 |

FOREIGN PATENT DOCUMENTS

| JP | 4-263244 | 9/1992 |
| JP | 10-293268 | 11/1998 |
| JP | 10-333599 | 12/1998 |
| JP | 2000-162548 | 6/2000 |

\* cited by examiner

*Primary Examiner*—William C Dowling
*Assistant Examiner*—Ryan Howard
(74) *Attorney, Agent, or Firm*—Wenderoth, Lind & Ponack, L.L.P.

(57) ABSTRACT

A two-dimensional image display device having a center wavelength of a red color source set in a range from 635 nm to 655 nm and having a center wavelength of a blue light source set in a range from 420 nm to 455 nm, to obtain a bright and clear image at minimum power consumption.

6 Claims, 6 Drawing Sheets

TWO-DIMENSIONAL IMAGE DISPLAY DEVICE

BACKGROUND OF THE INVENTION

1. Field of the Invention

The present invention relates to a two-dimensional image display device and, more particularly, relates to improvement of video display devices such as a video projector, a television receiver, a liquid crystal panel and the like.

2. Description of the Related Art

In recent years, an image projection device has been widespread as a two-dimensional image display device using a high-pressure mercury discharge lamp as a light source. In this device, light emitted from the high-pressure mercury discharge lamp is separated into red light (long wavelength light), green light (intermediate wavelength light), and blue light (short wavelength light) by using a wavelength selection mirror, and the respective color lights are individually modulated by a liquid crystal panel and then multiplexed by a dichroic prism, whereby a color image is projected on a screen using a projection lens. However, the spectrum emitted from the lamp covers the entire visible area, and the spectrum of the light divided by the wavelength selection mirror has a relatively wide spectrum width exceeding 100 nm. Therefore, bright pure colors cannot be displayed. Accordingly, a laser display capable of brighter color representation has attracted attention. The laser display employs three kinds of laser light sources corresponding to red, blue, and green, and it is constructed as shown in FIG. 9.

With reference to FIG. 9, reference numeral 200 denotes a laser display including laser light sources 1a~1c for emitting laser lights corresponding to three colors of R, G, and B, diffusers 6a~6c for diffusing light, and an optical system for irradiating the diffusers 6a~6c with the laser lights outputted from the laser light sources 1a~1c. The laser display 200 further includes diffuser wobbling means 13a~13c for wobbling the diffusers 6a~6c, and spatial light modulators 7a~7c for modulating the lights that are emitted from the respective laser light sources 1a~1c and diffused by the diffuser wobbling means 13a~13c. The laser display 200 further includes a dichroic prism 9 for multiplexing the lights that pass through the spatial light modulators 7a~7c, and a projection lens 10 for enlarging and projecting the light multiplexed by the dichroic prism 9 onto a screen 11.

The laser light source 1a is a red laser light source that emits red laser light. An optical system corresponding to this red laser light source 1a includes a beam expander 2a for expanding the light emitted from the laser light source 1a, and a light integrator 3a for making the in-plane intensity distribution of the light expanded by the beam expander 2a uniform. Further, this optical system includes a condenser lens 12a for condensing the light emitted from the light integrator 3a, a mirror 15a for reflecting the light condensed by the condenser lens 12a, and a field lens 8a for converting the light reflected from the mirror 15a into convergent light and irradiating the diffuser 6a with the convergent light.

The laser light source 1b is a green laser light source that emits green laser light. An optical system corresponding to this green laser light source 1b includes a beam expander 2b for expanding the light emitted from the laser light source 1b, and a light integrator 3b for making the cross-section intensity distribution of the light expanded by the beam expander 2b uniform. Further, this optical system includes a condenser lens 12b for condensing the light outputted from the light integrator 3b, and a field lens 8b for converting the light condensed by the condenser lens 12b into convergent light and irradiating the diffuser 6b with the convergent light.

The laser light source 1c is a blue laser light source that emits blue laser light. An optical system corresponding to this blue laser light source 1c includes a beam expander 2c for expanding the light emitted from the laser light source 1c, and a light integrator 3c for making the cross-section intensity distribution of the light expanded by the beam expander 2c uniform. Further, this optical system includes a condenser lens 12c for condensing the light outputted from the light integrator 3c, a mirror 15c for reflecting the light condensed by the condenser lens 12c, and a field lens 8c for converting the reflected light from the mirror 15c into convergent light and irradiating the diffuser 6c with the convergent light.

The lights emitted from the red, green, and blue laser light sources 1a, 1b, and 1c are expanded by the beam expanders 2a, 2b, and 2c, and the expanded lights pass through the light integrators 3a, 3b, and 3c and the condenser lenses 12a, 12b, and 12c, respectively. The optical paths of the red light and the blue light are bent at 90 degrees by the mirrors 15a and 15c. The red, green, and blue lights irradiate the spatial light modulators 7a, 7b, and 7c through the field lenses 8a, 8b, and 8c and the diffusers 6a, 6b, and 6c, respectively. Meanwhile, the lights pass through the light integrators 3a, 3b, and 3c, whereby the luminance distributions thereof on the spatial light modulators 7a, 7b, and 7c become uniform. The lights individually modulated by the spatial light modulators 7a, 7b, and 7c are multiplexed by the dichroic prism 9, and the multiplexed light is enlarged and projected by the projection lens 10 to be focused on the screen 11. At this time, since the laser light is highly coherent, speckle noise is imposed on the image projected on the screen. In order to avoid the speckle noise, the diffusers 6a, 6b, and 6c are wobbled by the diffuser wobbling means 13a~13c, whereby the speckle noise is temporally averaged to be reduced.

The greatest characteristic of the device shown in FIG. 9 is as follows. That is, since each of the lights emitted from the laser light sources has a very narrow emission spectrum of 5 nm or less, the color range that can be expressed by mixing the lights becomes very broad. FIG. 7 is a chromaticity diagram (1931 CIE chromaticity diagram) expressing the color range. In FIG. 7, a range shown by a triangle with Δ marks as apexes is a color range of a video signal defined by the NTSC standard, and a range shown by a triangle with O marks as apexes is a color range obtained when a red light source having a center wavelength of 633 nm, a green light source having a center wavelength of 532 nm, and a blue light source having a center wavelength of 457 nm are employed. As is evident from the chromaticity diagram, the color range of the laser display (the region inside the three O marks) is larger than the color range that can be expressed by the NTSC signal (the region inside the three Δ marks) excluding a small portion of the blue region, resulting in brighter color representation.

By the way, especially in the red and blue regions, since a difference in the widths of the color regions significantly affects the sharpness and realism of the image, a red light source of a longer wavelength and a blue light source of a shorter wavelength are required. However, when employing a red light source of a longer wavelength and a blue light source of a shorter wavelength, visibility of human eyes is drastically degraded, larger output power light sources are needed.

As described above, it has been considered that, in order to realize a practical two-dimensional image display device, the respective light sources must be set at optimum wavelengths, in view of the trade-off relationship between the width of the color region and the required light source output. For example, according to Japanese Published Patent Application No. Hei. 10-293268 (Pages 3-7, FIGS. 2-6), it is desirable to use a red light source having a wavelength of 635 nm or less which does not cause significant reduction in visibility, and a blue light source having a wavelength of 455 nm or less which also does not cause significant reduction in visibility.

A major problem in realizing the above-mentioned laser display is luminance efficiencies of the respective laser light sources. The conventional laser display has employed, as a light source, a vapor laser such as a helium-neon laser or a Krypton laser, or a combination of a YAG (Yttrium Aluminum Garnet) solid laser and a non-linear optical element, which performs wavelength conversion. These light sources have relatively low emission efficiencies, and their sizes and power consumptions are undesirably increased in order to realize bright wide-screen display. Therefore, the scale of the whole device is undesirably increased, which prevents realization of practical laser displays.

The present invention is made to solve the above-described problems and has for its object to provide a two-dimensional image display device which can solve the problems of increased sizes and power consumptions of light sources, and which can emit pure white color.

BRIEF SUMMARY OF THE INVENTION

A two-dimensional image display device according to a first aspect of the present invention comprises a red light source for emitting red light, a green light source for emitting green light, a blue light source for emitting blue light, and a means for forming a two-dimensional image by using the lights emitted from the respective light sources of the three colors, and the center wavelength of the blue light source is not less than 420 nm and not larger than 455 nm.

According to a second aspect of the present invention, in the two-dimensional image display device according to the first aspect of the invention, the center wavelength of the red light source is not less than 635 nm and is not larger than 655 nm, and the center wavelength of the green light source is not less than 505 nm and is not larger than 550 nm.

According to a third aspect of the present invention, in the two-dimensional image display device according to the first aspect of the invention, a ratio of light output from the blue light source to light output from the green light source during white display is not less than 0.5:1 and is not larger than 4:1, and a ratio of light output from the red light source to light output from the green light source during white display is not less than 0.4:1 and is not larger than 1.3:1.

According to a fourth aspect of the present invention, in the two-dimensional image display device according to the first aspect of the invention, the center wavelength of the red light source is not less than 635 nm and not larger than 655 nm.

According to a fifth aspect of the present invention, in the two-dimensional image display device according to the first aspect of the invention, the center wavelength of the green light source is not less than 505 nm and is not larger than 550 nm.

According to a sixth aspect of the present invention, in the two-dimensional image display device according to the first aspect of the invention, the center wavelength of the blue light source is not less than 440 nm and not larger than 455 nm.

According to a seventh aspect of the present invention, in the two-dimensional image display device according to the first aspect of the invention, the center wavelength of the blue light source is not larger than 440 nm.

According to an eighth aspect of the present invention, in the two-dimensional image display device according to the first aspect of the invention, the blue light source is a semiconductor laser based on gallium nitride.

According to a ninth aspect of the present invention, in the two-dimensional image display device according to the first aspect of the invention, the red light source is a semiconductor laser based on AlGaInP.

According to a tenth aspect of the present invention, in the two-dimensional image display device according to the first aspect of the invention, light emitted from each light source has a spectrum width equal to or smaller than that of a semiconductor laser source.

A two-dimensional image display device according to the first aspect of the present invention comprises a red light source for emitting red light, a green light source for emitting green light, a blue light source for emitting blue light, and a means for forming a two-dimensional image by using the lights emitted from the respective light sources of the three colors, and the center wavelength of the blue light source is not less than 420 nm and is not larger than 455 nm. Therefore, the center wavelength of the blue light source can be limited within a region where light output is small and a wide color range can be obtained, resulting in a reduction in power consumption.

Further, according to the second aspect of the present invention, in the two-dimensional image display device according to the first aspect of the invention, the center wavelength of the red light source is not less than 635 nm and is not larger than 655 nm, and the center wavelength of the green light source is not less than 505 nm and is not larger than 550 nm. Therefore, the center wavelengths of the red light source and the blue light source can be limited within a region where light output is small and a relatively wide color range can be obtained, resulting in a reduction in power consumption. Furthermore, since the above-mentioned center wavelengths are selected for the respective light sources, emission of pure white can be realized while suppressing light output.

Further, according to the third aspect of the present invention, in the two-dimensional image display device according to the first aspect of the invention, the ratio of light output from the blue light source to light output from the green light source during white display is not less than 0.5:1 and is not larger than 4:1, and the ratio of light output from the red light source to light output from the green light source during white display is not less than 0.4:1 and is not larger than 1.3:1. Therefore, the center wavelengths of the blue light source, the red light source, and the green light source can be limited within a region where light output is small and a relatively wide color range can be obtained. Further, since the above-mentioned center wavelengths are selected for the respective light sources, emission of pure white can be realized while suppressing light output.

Further, according to the fourth aspect of the present invention, in the two-dimensional image display device according to the first aspect of the invention, the center wavelength of the red light source is not less than 635 nm and is not larger than 655 nm. Therefore, the center wavelength of the red light source can be limited within a region where light output is small and a wide color range can be obtained.

Further, according to the fifth aspect of the present invention, in the two-dimensional image display device according to the first aspect of the invention, the center wavelength of the green light source is not less than 505 nm and is not larger than 550 nm. Therefore, the center wavelength of the green light source can be limited within a region where light output is small and a wide color range can be obtained.

Further, according to the sixth aspect of the present invention, in the two-dimensional image display device according to the first aspect of the invention, the center wavelength of the blue light source is not less than 440 nm and is not larger than 455 nm. Therefore, the center wavelength of the blue light source can be limited within a region where light output is small and a wide color range can be obtained.

Further, according to the seventh aspect of the present invention, in the two-dimensional image display device according to the first aspect of the invention, the center wavelength of the blue light source is not larger than 440 nm. Therefore, when a semiconductor laser is employed as a blue light source, efficiency and reliability of the light source are enhanced.

Further, according to the eighth aspect of the present invention, in the two-dimensional image display device according to the first aspect of the invention, the blue light source is a semiconductor laser based on gallium nitride. Therefore, a compact and efficient blue light source is realized.

Further, according to the ninth aspect of the present invention, in the two-dimensional image display device according to the first aspect of the invention, the red light source is a semiconductor laser based on AlGaInP. Therefore, a compact and efficient red light source is realized.

Further, according to the tenth aspect of the present invention, in the two-dimensional image display device according to the first aspect of the invention, light emitted from each light source has a spectrum width equal to or smaller than that of a semiconductor laser source. Therefore, bright color representation is realized by the light source of the narrow spectrum width.

DETAILED DESCRIPTION OF THE INVENTION

Embodiment 1

Hereinafter, embodiments of the present invention will be described.

Figure 1:
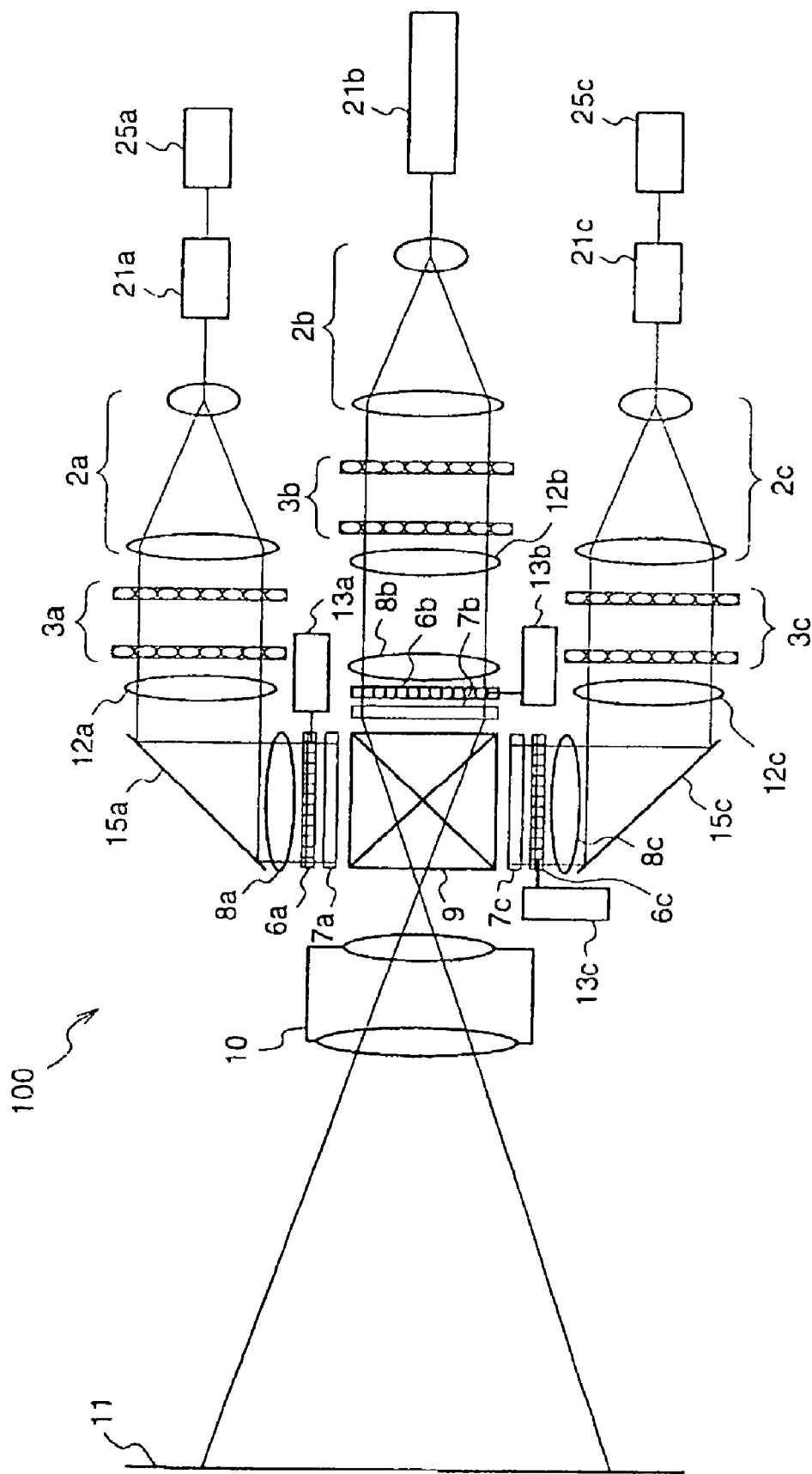
FIG. 1 is a diagram illustrating a schematic construction of a two-dimensional image display device according to a first embodiment of the present invention.
Figure 2:
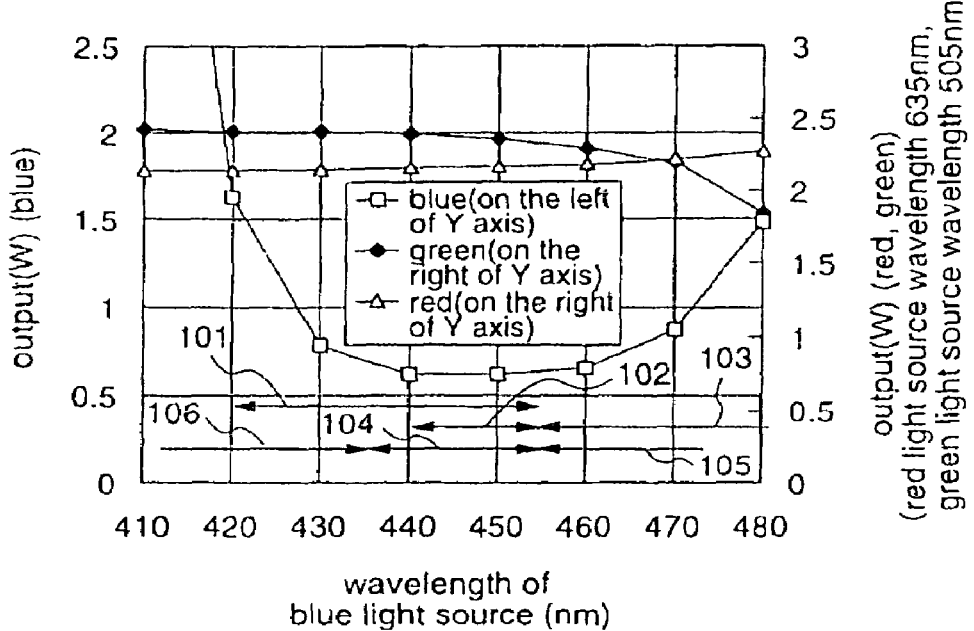
FIG. 2 is a diagram illustrating calculation results of light source outputs required for white display, with respect to wavelengths of a blue light source.
Figure 3:
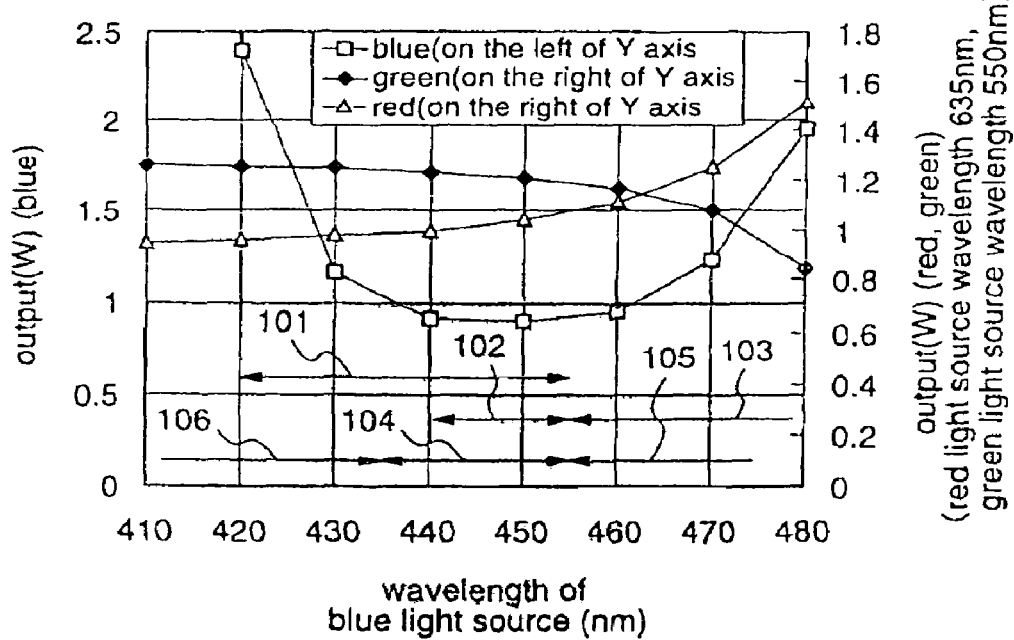
FIG. 3 is a diagram illustrating calculation results of light source outputs required for white display, with respect to wavelengths of a blue light source.
Figure 4:
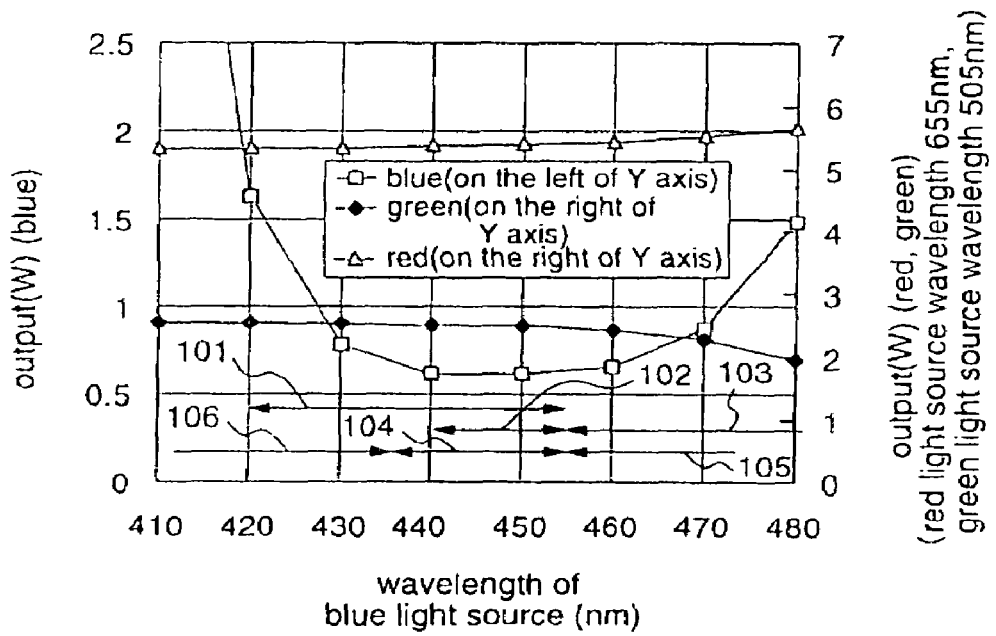
FIG. 4 is a diagram illustrating calculation results of light source outputs required for white display, with respect to wavelengths of a blue light source.
Figure 5:
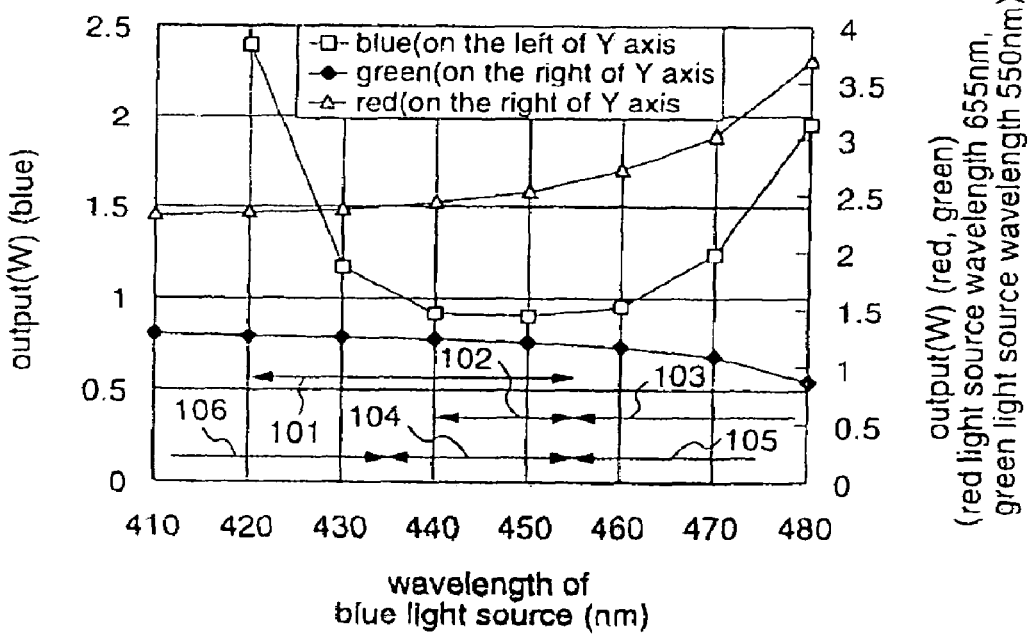
FIG. 5 is a diagram illustrating calculation results of light source outputs required for white display, with respect to wavelengths of a blue light source.

FIG. 1 is a diagram illustrating an example of a construction of a two-dimensional image display device according to a first embodiment of the present invention.

In FIG. 1, reference numeral 100 denotes a two-dimensional image display device according to the first embodiment of the present invention.

Figure 9:
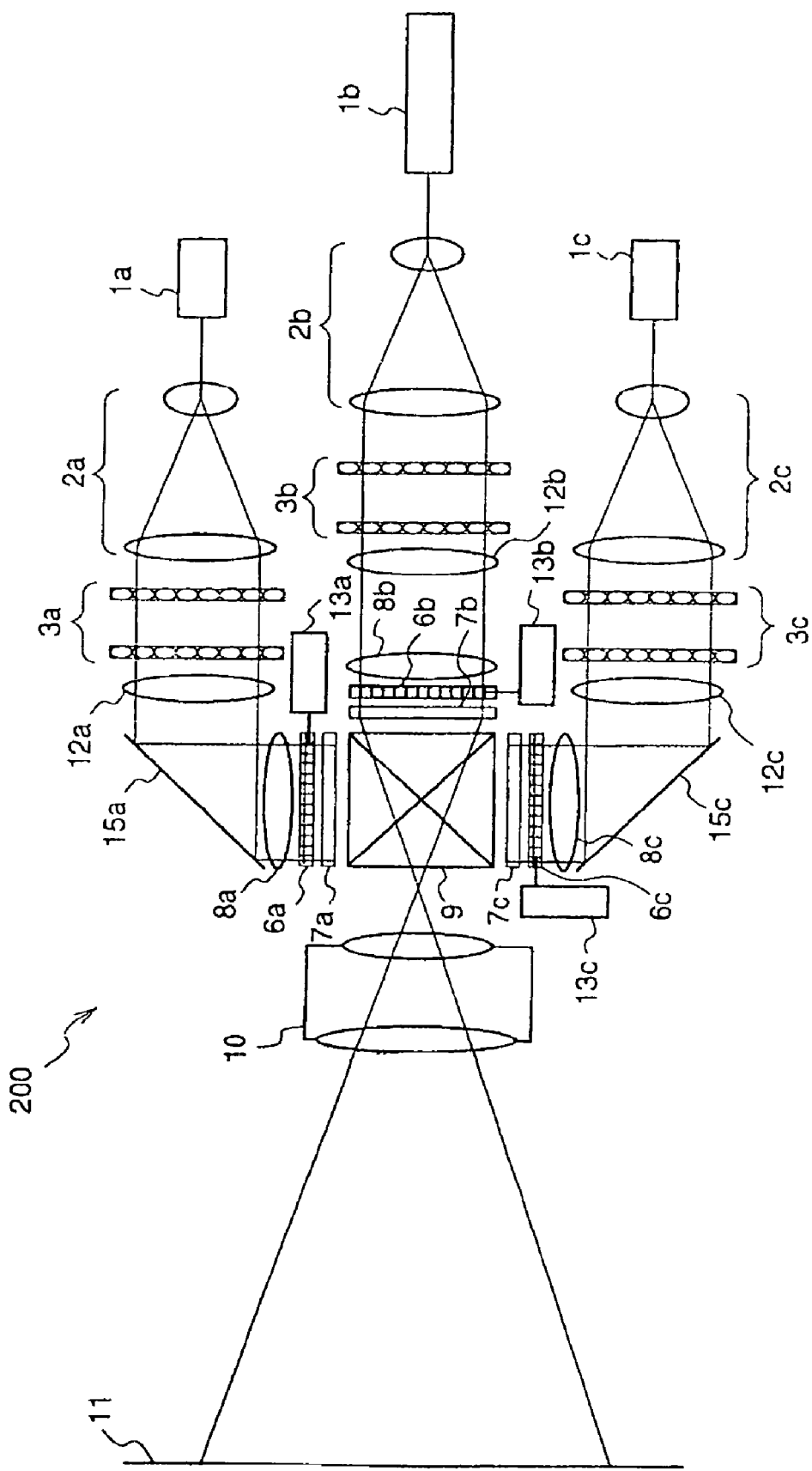
FIG. 9 is a diagram illustrating a schematic construction of a conventional two-dimensional image display device.

The two-dimensional image display device 100 employs semiconductor lasers for the blue light source and the red light source included in the conventional two-dimensional image display device shown in FIG. 9. The center wavelength of a red semiconductor laser 21a as a red light source is in a range of 635 nm~655 nm, the center wavelength of a blue semiconductor laser 21c as a blue light source is in a range of 420 nm~455 nm, and the center wavelength of a green laser 21b is in a range of 505 nm~550 nm. Further, high frequency power supplies 25a and 25c are connected to the red semiconductor laser 21a and the blue semiconductor laser 21c, respectively, thereby to expand oscillation spectrums.

An optical system for irradiating spatial light modulators 7a~7c by beam expanders 2a~2c, light integrators 3a~3c, and condenser lenses 12a~12c, an optical system for wobbling diffusers 6a~6c with diffuser wobbling means 13a~13c to reduce speckle noise, and an optical system for projecting an image on a screen 11 by a dichroic prism 9 and a projection lens 10 (two-dimensional image forming means) are identical to those of the conventional device.

While the two-dimensional image display device shown in FIG. 1 employs semiconductor lasers as examples of a blue light source and a red light source, the light sources are not restricted to semiconductor lasers. Any light source may be employed so long as emitted light has a spectrum width equal to or shorter than that of the semiconductor laser. For example, a super luminescence diode may be employed. When semiconductor lasers are not used as light sources, the high frequency power supplies 25a and 25c are dispensed with.

Next, the function and effect will be described.

In the two-dimensional image display device according to the first embodiment, the ranges of the center wavelengths of the blue light source and the red light source (in FIG. 1, the red semiconductor laser 21a and the blue semiconductor laser 21c) are optimized, which will be described in detail hereinafter.

Initially, output powers of the blue light source and the red light source which are required when the oscillation wavelength of the blue light source or the red light source is varied to obtain white color corresponding to a standard white light source while suppressing the output, are derived by calculation. Consequently, we discovered that, in the blue region where the visibility changes monotonously with respect to the wavelength, the required light output does not change monotonously with respect to the wavelength of the light source, but there exists an optimum wavelength at which the required light output is minimized. The result is shown in FIGS. 2 to 5.

The calculation method relating to FIGS. 2 to 5 is as follows.

Generally, chromaticity and luminous flux of a composite color obtained by mixing two kinds of lights are calculated according to the following formulae. To be specific, when a luminous flux of A1 lumen whose chromaticity coordinates are expressed by (x1,y1) and a luminous flux of A2 lumen whose chromaticity coordinates are expressed by (x2,y2) are mixed to obtain a composite color, chromaticity coordinates (x3,y3) and luminous flux A3 of the composite color are respectively expressed by:

$x3=(y2*x1*A1+y1*x2*A2)/(y2*A1+y1*A2);$ $y3=y1*y2*(y1+y2)/(y2*A1+y1*A2);$ and $A3=A1+A2.$ Accordingly, light obtained by mixing lights of three colors is obtained by initially calculating chromaticity coordinates and luminous flux of a composite color obtained when mixing the first and second lights of two colors using the above-mentioned calculation formulae, and further, mixing the composite color and the third light.

The output powers of the light sources shown in FIGS. 2 to 5 are calculated according to the following procedure. Initially, luminous fluxes of three colors of wavelengths corresponding to the respective points on the diagrams are randomly determined, and chromaticity coordinates and luminous flux of a composite color obtained by mixing these colors are calculated. Next, chromaticity coordinates of a composite color which is obtained by mixing arbitrarily selected luminous fluxes are calculated for each case, and luminous fluxes of blue, red, and green lights are determined by cut and try so that chromaticity coordinates of the composite light of the three colors becomes equal to the coordinates (x,y)=(0.313,0.329) of light from a standard white light source d65 (d: daylight).

FIGS. 2 to 5 illustrate the outputs of the respective light sources plotted with respect to the wavelength of the blue light source, which outputs are obtained when the center wavelength of the red light source is set at 635 nm or 655 nm and the center wavelength of the green light source is set at 505 nm or 535 nm, and the total luminous flux becomes 1000 lumen when the lights emitted from the light sources are mixed, and the coordinates on the chromaticity diagram match the chromaticity coordinates of the standard white light source d65. The reason why the center wavelengths of the red light source and the green light source are set as described above is because the light output of the red light source is small and a wide color region is obtained when the center wavelength thereof is in a range of 635~655 nm, and the light output of the green light source is small and a wide color range is obtained when the center wavelength thereof is in a range of 505~550 nm. Further, as for the red light source, it is expected from the chromaticity diagram of FIG. 7 that, in order to make the expressible color range larger than that of the NTSC, the center wavelength should be set at a wavelength in the vicinity of the color range of the NTSC. Further, even when the wavelength is changed in the vicinity of the color range expressible by the NTSC signal, the outline of the graph of the output from the blue light source does not change qualitatively. Further, the reason why the total luminous flux is set at 1000 lumen is because about 1000 lumen is necessary to secure brightness as high as that of a commercially available projector.

As shown in FIGS. 2 to 5, the output of the blue light source can be minimized when the center wavelength thereof is in the range of 420 nm~480 nm regardless of whether the center wavelength of the red light source is set at 635 nm or 655 nm and whether the center wavelength of the green light source is set at 505 nm or 550 nm. Further, when the center wavelength of the blue light source exceeds 455 nm (region 103 in FIGS. 2 to 5), a wide color range cannot be obtained. Therefore, an optimum range of the center wavelength of the blue light source in which required output is small and a wide color range is obtained is 420 nm~455 nm (optimum region 101 shown in FIGS. 2 to 5). Further, the ratio of the outputs of the blue light source and the green light source in the optimum region 101 during white color display is not less than 0.5:1 and is not larger than 4:1, and the ratio of the outputs of the red light source and the green light source during white color display is not less than 0.4:1 and is not larger than 3:1.

Further, when the optimum region is determined from the view point of output, a region (region 102) of the center wavelength of 440 nm~455 nm, at which the output is minimized, is a more preferable region for the blue light source.

The above mentioned matters are integrated as follows. While the conventional laser display device employs a blue light source of a relatively long wavelength and a red light source of a relatively short wavelength, it is possible in this first embodiment to realize a two-dimensional image display device that can emit pure white color at minimum output power, and provide a wide color range, by setting the center wavelength of the blue light source in a range not less than 420 nm and not larger than 455 nm, the center wavelength of the red light source in a range not less than 635 nm and not larger than 655 nm, and the center wavelength of the green light source in a range not less than 505 nm and not larger than 550 nm. Further, since the center wavelength of the blue light source is set in a range from 440 nm to 455 nm, emission of pure white color can be obtained while minimizing the output power of the blue light source.

Figure 7:
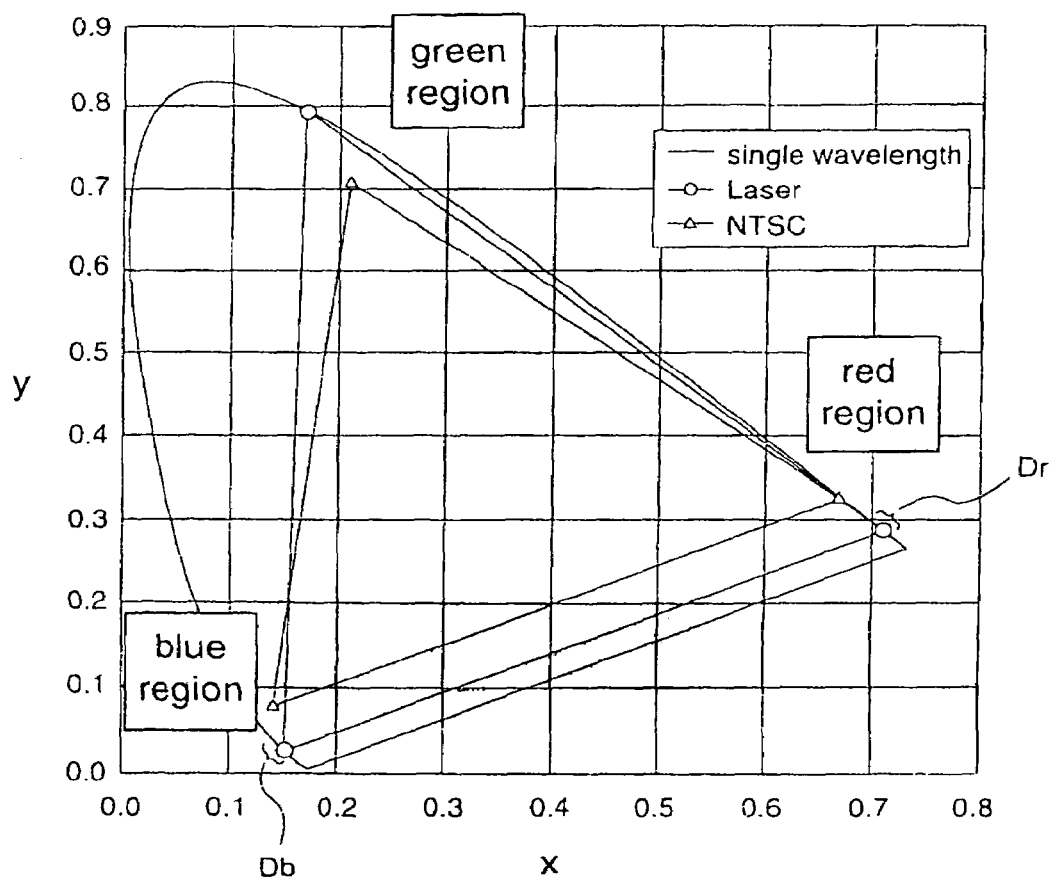
FIG. 7 is a chromaticity diagram illustrating color ranges that can be expressed by a laser projector and a NTSC standard, respectively.

The optimum region 101 of the blue light source and the center wavelength region (635 nm~655 nm) of the red light source are shown by chromaticity diagrams Db and Dr in FIG. 7, respectively, indicating that the color range is expanded.

Hereinafter, a description will be given of the case where the blue light source is limited to a semiconductor laser. In this case, as shown in FIGS. 2 to 5, an optimum region of the blue semiconductor laser is a region 104 that is sandwiched between a region 106 where the visibility is relatively small, and a region 103 where a wide color range cannot be obtained and a region 105 where realization of a large-output blue semiconductor laser is difficult. That is, the reason why large output is required in the region 106 that is on the shorter wavelength side than the region 104 is because the visibility is reduced in this region. Further, the reason why large output is required in the region 103 that is on the longer wavelength side than 455 nm is because the color of the light source approximates the color of the d65 light source of the display color and therefore higher light output than the red light and the green light is required. Further, the region on the longer wavelength side than 455 nm is also a region where realization of a large-output blue semiconductor laser is difficult. Thus, in the blue semiconductor laser, in order to obtain an image of the same brightness with less light output, the center wavelength of the light source should be set at 435 nm~455 nm. Since this region 104 overlaps the optimum region 101 shown in FIGS. 2 to 5 where required output of the blue light source is small and a wide color range is obtained, the present invention is effective also when a semiconductor laser is used as the blue light source.

Figure 6:
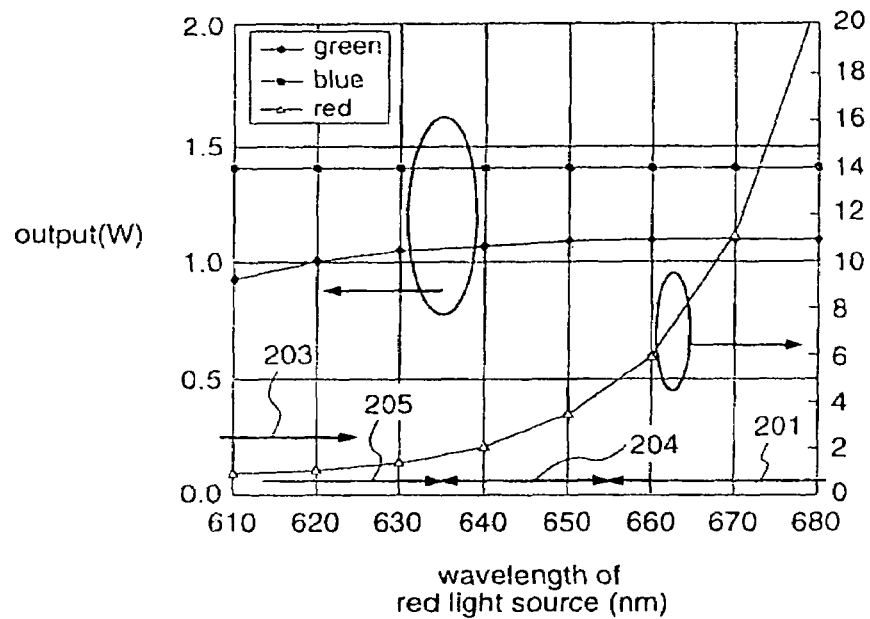
FIG. 6 is a diagram illustrating calculation results of light source outputs required for white display, with respect to wavelengths of a red light source.

Next, a description will be given of the case where the red light source is restricted to a semiconductor laser, with reference to FIG. 6. The calculation method relating to FIG. 6 is identical to the calculation method relating to FIGS. 2 to 5, and therefore, repeated description is not necessary. In FIG. 6, the outputs of the respective light sources are plotted with respect to the wavelength of the red light source, which outputs are obtained when the center wavelengths of the green light source and the blue light source are fixed to 532 nm and 457 nm, respectively, the total luminous flux becomes 1000 lumen when the lights emitted from the light sources are mixed, and the position on the chromaticity diagram matches the chromaticity coordinates of the color of the standard white light source d65. The reason why the center wavelengths of the green light source and the blue light source are set at 532 nm and 457 nm, respectively, is because light sources of these wavelengths have already been commercially available.

In the case of the red light, since the visibility reduces in a region 201 on the longer wavelength side, the output of the light source may be smaller as the wavelength is shorter in the range of 610 nm and larger, which is adopted for the calculation. To be specific, it is preferred that the center wavelength of the red light source is 655 nm or less at which the output of the red light source is less than 5 times of the output of the blue or green light source and white color display can be carried out. Further, in a region 203 where the wavelength of the red light source is 625 nm and less, the color range becomes as narrow as that of the NTSC standard, and the characteristics of the laser display device cannot be effectively utilized. Further, a shorter wavelength region 205 where the wavelength of the red light source is 635 nm and less is also a region where it is difficult to realize a large-output red semiconductor laser. Accordingly, an optimum region 204 ranges from 635 nm to 655 nm. The ratio of the outputs of the red light source and the green light source in this region 204 is not less than 1.8:1 and is not larger than 5:1.

The optimum region 104 of the blue semiconductor laser and the optimum region 204 of the red semiconductor laser are shown by chromaticity diagrams Db and Dr in FIG. 7, respectively, indicating that the color range is expanded.

As described above, as a laser light source that outputs light of a wavelength range in which brighter image display is possible with smaller light output, there may be employed a helium-neon laser having a wavelength of 633 nm, a Krypton laser having a wavelength of 647 nm, a wavelength conversion laser based on a Nd-YAG solid laser having a wavelength of 630 nm, or an AlGaInP system semiconductor laser having a wavelength of 630 nm~680 nm.

Among these lasers, the vapor laser such as a helium-neon laser and the wavelength conversion laser have relatively low emission efficiencies, and therefore require large laser heads to realize bright display, leading to drawbacks such as increase in device size or increase in power consumption. On the other hand, an AlGaInP system semiconductor laser is smaller in size and more efficient as compared with the above-mentioned lasers, and therefore, it is advantageous to reductions in device size and power consumption.

In recent years, development of a high-output red semiconductor laser has been remarkable, and a red semiconductor laser having output power exceeding 100 mW has been put to practical use as a laser for recording/playback optical disc drive. Although a projector of about 100 inches or smaller requires a light source output of 1~several W, since restriction on wave aberration of the projector light source is relatively small as compared with an optical disc drive light source, a wide stripe semiconductor laser having a large emission point size can be used, and therefore, a semiconductor laser exceeding 1 W is easily realized. Another advantage in using a semiconductor laser is that the coherence is reduced by superposing a high frequency signal on drive current and thereby speckle noise can be easily reduced.

By the way, the oscillation wavelength of a semiconductor laser is restricted for the following reason. The composition of AlGaInP crystal is expressed by $(Al_xGa_{1-x})_{0.5}In_{0.5}P$. In a red semiconductor laser using this crystal, the band gap increases with increase in the ratio of the Al composition x, and the oscillation wavelength becomes shorter. For example, a band gap of about 2.3 eV (wavelength of about 540 nm) is obtained when x is 0.7. However, in a region where x is relatively large, confinement of carriers (especially electrons) in an active layer is insufficient, and reactive current increases due to increase in overflow current. As the result, it becomes difficult to perform high-output operation and high-temperature operation. Because of this restriction, the oscillation wavelength must be set at 635 nm or larger in order to obtain an output of several W that is required for laser display, under room temperature.

Further, as a blue laser source which outputs light of a wavelength range in which brighter image display is realized with smaller light output, there may be employed a helium-cadmium laser having a wavelength of 441 nm, or a SHG (Second Harmonic Generation) laser having a wavelength of 457 nm which is obtained by combining a Nd-doped YAG solid laser and a non-linear optical element. The SHG laser converts laser light from the solid laser into half-wavelength light by a non-linear medium of the non-linear optical element. Further, development of a semiconductor laser based on gallium nitride (AlGaInN system) having a wavelength of 400 nm~460 nm has been popular in recent years, and a watt-class laser is coming to realization. Among these lasers, the helium-cadmium laser and the SHG laser have relatively low emission efficiencies, and therefore require large laser heads to realize bright display, leading to drawbacks such as increase in device size or increase in power consumption. On the other hand, an AlGaInN system semiconductor laser is smaller in size and more efficient as compared with the above-mentioned lasers.

Figure 8:
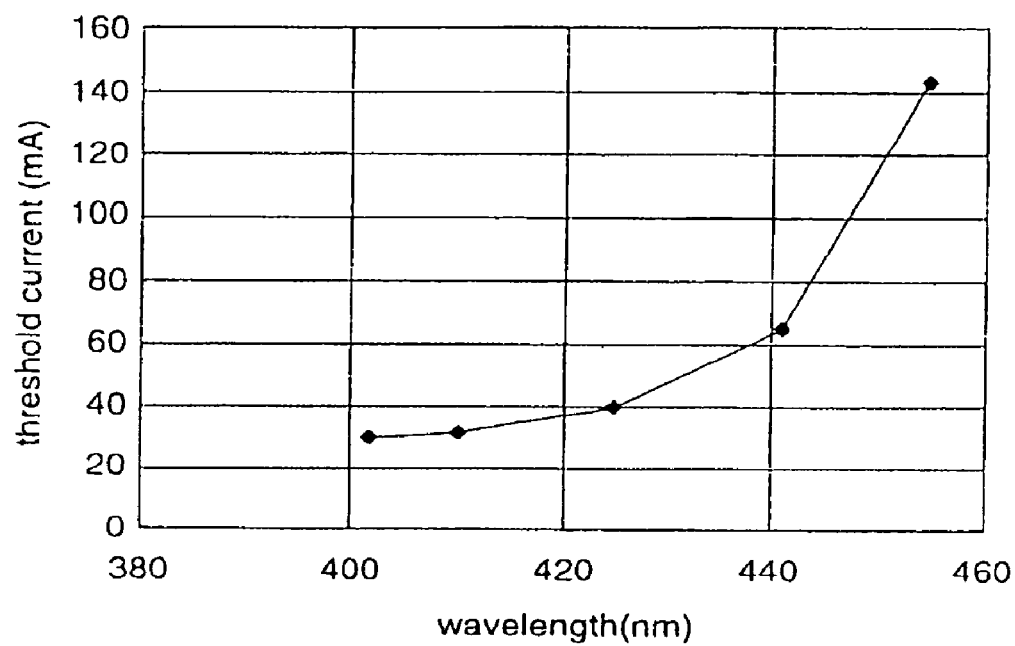
FIG. 8 is a diagram illustrating relationships between oscillation wavelengths and oscillation thresholds of an AlGaInN system semiconductor laser.

The center wavelength of the AlGaInN system laser varies in accordance with the composition ratio of In, and light of longer wavelength can be obtained as the composition ratio of In becomes higher. However, segregation of In in the crystal increases with an increase in the concentration of In, and therefore, it is difficult to realize a highly efficient and reliable AlGaInN system semiconductor laser that oscillates with a low-threshold current. Several kinds of semiconductor lasers are experimentally produced with the In concentrations in active layer regions thereof being varied, and the oscillation wavelengths and the oscillation threshold currents are measured. The result of the measurement is shown in FIG. 8. As shown in FIG. 8, the threshold current increases with an increase in the wavelength. When the wavelength exceeds 440 nm, the increase in the threshold current becomes prominent, and no oscillation occurs in a region where the wavelength exceeds 455 nm. Consequently, a laser having a wavelength of 455 nm or less should be preferably employed in order to realize a two-dimensional image display device using an AlGaInN system semiconductor laser. Further, since it becomes more difficult to realize high output and long life simultaneously in a semiconductor laser having a large threshold current, more preferably a laser having a wavelength of 440 nm or less should be employed. It is discovered that, when using a laser of this wavelength, a highly efficient and reliable two-dimensional image display device having a relatively small oscillation threshold value can be realized.

The above-mentioned matters are integrated as follows. It is discovered that, in this first embodiment, a compact and efficient two-dimensional image display device that provides a wide color range can be realized by setting the center wavelength of the blue light source in a range not less than 420 nm and not larger than 455 nm and setting the center wavelength of the red light source in a range not less than 635 nm and not larger than 655 nm, while the conventional laser display device employs a blue light source of a relatively long wavelength and a red light source of a relatively short wavelength. Further, it is discovered that, more preferably, a highly efficient and reliable two-dimensional image display device having a relatively small oscillation threshold is realized by using, as a blue light source, an AlGaInN system semiconductor laser having a center wavelength in a range not less than 420 nm and not larger than 440 nm.

As for a green laser, at present there is no prospect for realization of a semiconductor laser itself exceeding 1 watt, but a light source utilizing a second-order harmonic wave (wavelength 532 nm) of output light from a semiconductor laser excitation Nd-doped YAG solid laser (wavelength 1064 nm) is commercially available, and therefore, a relatively efficient and compact green solid laser can be used although it comes short of direct oscillation of a semiconductor laser.

Thus, a laser display with high efficiency and low power consumption is realized by restricting the wavelengths of the light sources.

As described above, according to the first embodiment, when implementing a two-dimensional image display device by using semiconductor lasers, a laser having a center wavelength in a range of 635 nm~655 nm is used as a red semiconductor laser source while a laser having a center wavelength in a range of 420 nm~455 nm is used as a blue semiconductor laser source. Therefore, it is possible to solve the problem that the power consumption and the size of the light source is undesirably increased when using a vapor laser or a solid laser, thereby realizing a two-dimensional image display device which can perform emission of pure white color with reduced output power.

Further, when a blue semiconductor laser source having a center wavelength in a range not less than 420 nm and not larger than 440 nm is particularly used, the output power of the blue light source can be increased, and furthermore, the reliability thereof can be enhanced.

While the two-dimensional image display device of the present invention has been described taking a projection type display as an example, the present invention is also applicable to a rear-surface projection type display. Further, it is also applicable to a two-dimensional optical switch type display such as a liquid crystal panel type display using a laser light source as a back light.

Furthermore, while in the first embodiment the gallium nitride semiconductor laser and the AlGaInP system semiconductor laser are adopted as the blue semiconductor laser source and the red semiconductor laser source, respectively, semiconductor lasers comprising other materials may be used so long as oscillations of blue and red can be carried out using the semiconductor lasers of other materials. In this case, it is supposed that the output characteristics of the semiconductor lasers may be varied in accordance with variations in the materials of the semiconductor lasers and the compositions of the materials. Even in this case, when regions corresponding to the optimum regions 104 and 204 of the semiconductor laser sources shown in FIGS. 2 to 6 exist, the present invention is obviously applicable.

Moreover, if a semiconductor laser is realized for a green light source, it is desired to use the semiconductor laser. Also in this case, when an optimum region of output of the semiconductor laser exists, the present invention is obviously applicable.

As described above, a two-dimensional image display device according to the present invention can reduce power consumptions and sizes of light sources and emit pure white color, and therefore, it is useful as a video projector and a rear projection type television receiver. Besides these projection type devices, the two-dimensional image display device of the present invention is also useful as an optical switch type image display device, such as a liquid crystal television or a liquid crystal display, by using a similar light source for back-lighting.

The invention claimed is:

1. A two-dimensional image display device comprising:
a red light source for emitting red light;
a green light source for emitting green light;
a blue light source for emitting blue light; and
a means for forming a two-dimensional image by using the red light, the green light and the blue light emitted from the respective red, green and blue light sources,
wherein a center wavelength of the blue light emitted from the blue light source is not less than 420 nm and is not larger than 455 nm,
wherein a center wavelength of the red light emitted from the red light source is not less than 635 nm and is not larger than 655 nm,
wherein a center wavelength of the green light emitted from the green light source is not less than 505 nm and is not larger than 550 nm,
wherein a ratio of the blue light emitted from the blue light source to the green light emitted from the green light source during a white display is not less than 0.5:1 and is not larger than 4:1, and
wherein a ratio of the red light emitted from the red light source to the green light emitted from the green light source during the white display is not less than 0.4:1 and is not larger than 1.3:1.

2. The two-dimensional image display device as defined in claim 1, wherein the center wavelength of the blue light emitted from the blue light source is not less than 440 nm and is not larger than 455 nm.

3. The two-dimensional image display device as defined in claim 1, wherein the center wavelength of the blue light emitted from the blue light source is not larger than 440 nm.

4. The two-dimensional image display device as defined in claim 1, wherein the blue light source is a semiconductor laser based on gallium nitride.

5. The two-dimensional image display device as defined in claim 1, wherein the red light source is a semiconductor laser based on AlGaInP.

6. The two-dimensional image display device as defined in claim 1, wherein the red light, the green light and the blue light emitted from the respective red, green and blue light sources have a spectrum width that is equal to or smaller than that of a semiconductor laser source.

* * * * *